Aug. 18, 1959
W. GREGSON ET AL
2,900,600
ELECTRICAL FREQUENCY METERS
Filed Aug. 15, 1957
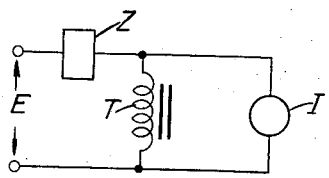
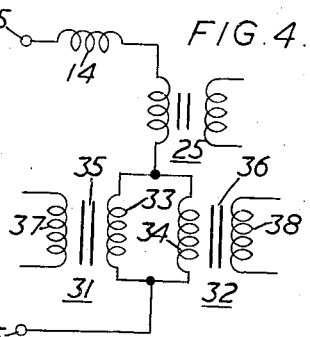
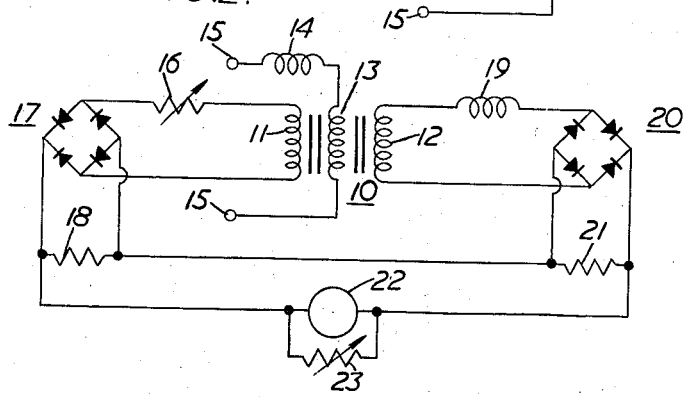
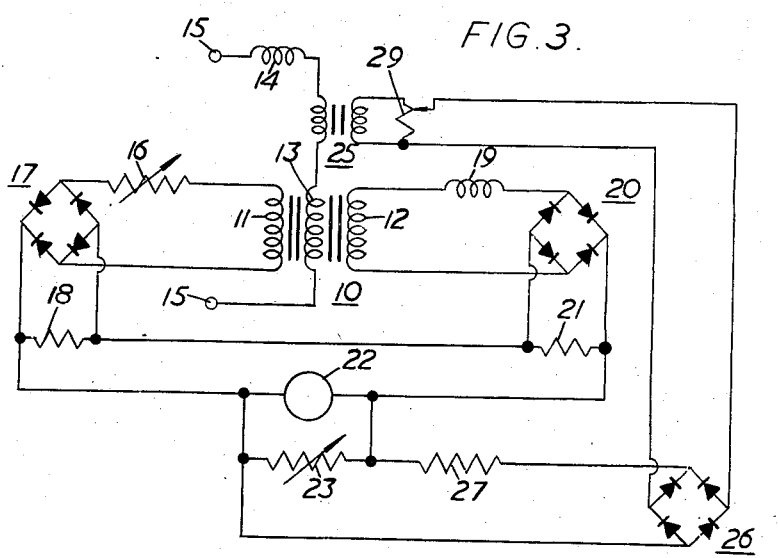
Inventors
William Gregson
William Frederick Sydney Turner
By
Cameron, Kerkam & Sutton
Attorneys United States Patent Office 2,900,600
Patented Aug. 18, 1959

2,900,600

ELECTRICAL FREQUENCY METERS

William Gregson, Newton, Chester, and William F. S. Turner, Whaley Bridge, near Stockport, England, assignors to Ferranti, Limited, Hollinwood, Lancashire, England, a company of Great Britain and Northern Ireland Application August 15, 1957, Serial No. 678,328

Claims priority, application Great Britain August 18, 1956

5 Claims. (Cl. 324—78)

This invention relates to electrical frequency meters.

An object of the invention is to provide a frequency meter of particularly rugged and reliable character; in particular, a meter which does not employ thermionic devices.

A further object is to provide a frequency meter in which the frequency is displayed on a standard kind of moving-coil instrument.

Another object is to provide a frequency meter which is substantially independent of variations of the amplitude of the voltage whose frequency is being measured and of the waveform of that voltage.

In accordance with the present invention, an electrical frequency meter includes a transformer with a saturable core common to two like secondary windings and a single primary winding, an impedance in series with the primary winding, means for rectifying the output voltage of each secondary winding, included in series with one of the secondary windings an inductor of value such that the rectified output voltage of this winding is substantially independent of frequency and dependent only on amplitude changes effective because of incomplete saturation of said core, and means for applying the difference between the rectified output voltages of the secondary windings to an instrument adapted to respond to such a difference, whereby when the series combination of the primary winding and the impedance are energised by a voltage of amplitude large enough to cause the core approximately to saturate during each half cycle of said energising voltage the response of the instrument varies with the frequency of said voltage but not appreciably with the amplitude thereof, said impedance having a value small enough to allow such saturation but large enough to absorb the excess voltage after such saturation.

Compensating means may be provided for applying across the instrument a rectified voltage linearly dependent on the amplitude of the primary current of the transformer, this voltage being of such sense and value as to minimise the response of the instrument to amplitude changes of said energising voltage.

In the accompanying drawings,

Figure 1 is a diagram to illustrate the principle of the invention,

Figures 2 and 3 are diagrams of connections of two embodiments of the invention, corresponding components being given the same reference numbers in each figure, and Figure 4 shows a part of Figure 3 modified in accordance with a further embodiment.

The principle of the invention will first be explained with reference to Fig. 1.

An inductor T having a saturable core is arranged to be energised by an alternating voltage E applied to the inductor in series with an impedance Z. The voltage has a variable frequency, which is to be measured, and an amplitude such as to carry the core to complete saturation during each half cycle. Assuming that saturation is in fact complete for each voltage swing, it will readily be appreciated from first principles that the voltage drop across the inductor remains independent of variations of the amplitude of the voltage E and of its waveform and is dependent solely on the frequency variations, this dependence being linear. The reading of an ordinary moving-coil instrument I, of suitable range, connected across the inductor can thus be made to indicate on its natural scale, suitably calibrated, the frequency of the voltage E.

The above assumption that the core saturates completely at each half cycle is not in practice justifiable and accordingly the arrangement of Fig. 1 is not accurate enough for practical use. An example of a modified form of this arrangement, in accordance with one embodiment of the invention, which yields accurate results will now be described with reference to Fig. 2.

The frequency meter includes a transformer 10 having a saturable core common to two secondary windings 11 and 12 and a single primary winding 13. Primary 13 is connected in series with an impedance, in the form of an inductor 14 (the value of which will be indicated later), between input terminals 15 to which the voltage whose frequency is to be measured—hereinafter referred to for convenience as the supply voltage—is applied.

Secondary 11 is connected in series with an adjustable resistor 16 to a full-wave rectifier 17 the D.C. output of which is applied across a load resistor 18.

Secondary 12 is connected in series with an inductor 19 to a full-wave rectifier 20 the D.C. output of which is applied across a load resistor 21.

A moving-coil instrument 22 of the centre-zero kind is connected in series with resistors 18 and 21 in such sense as to respond to the difference between the rectified output voltage from rectifiers 17 and 20. An adjustable resistor 23 is connected in shunt with the instrument.

The core of the transformer is of a material whose B–H loop is characterised by rapid saturation at a predetermined value of flux density. The amplitude of the supply voltage is chosen to be always in excess of that necessary to cause this value of the flux density to be reached during each half cycle.

Inductor 19 is designed to have a reactance, over the frequency range measured, which is at least ten times greater than the sum of its own resistance and that of resistor 21. The output of rectifier 20 is thus not only independent of the amplitude variations of the supply voltage, except in so far as complete saturation is not attained during each voltage swing, but is also independent of its frequency variations. The output of rectifier 20 is used to provide a backing-off voltage for the output of rectifier 17, to allow the centre zero instrument to be used and for a further purpose hereinafter explained.

In operation, the supply voltage is applied to terminals 15, this voltage having a minimum amplitude of the value indicated above. Approximate saturation is reached during each voltage swing, the excess voltage being then dropped across inductor 14. The impedance of inductor 14 is large enough to absorb this excess voltage, thereby preventing distortion of the supply waveform, but not large enough to prevent saturation.

The response of instrument 22 is linearly dependent on the frequency of the supply voltage, for the reasons given above in the description of the principle of the invention. Any changes of the output voltage of secondary 11 due to changes not of frequency but of amplitude and effective because of incomplete saturation are balanced out by corresponding changes of the backing-off voltage from secondary 12. By this means accurate readings are obtained despite incomplete saturation.

By adjustment of resistor 16 the instrument pointer may be brought to the centre reading at some convenient predetermined value of the frequency. The sensitivity of the meter may be adjusted by means of resistor 23.

To achieve still higher accuracy despite incomplete saturation, a linear current transformer 25 (see Fig. 3) may be inserted in series with primary 13 and the output applied, after adjustment at the potentiometer 29 and rectification by a full-wave rectifier 26, across the instrument 22 in series with an impedance 27, resistor 23 being again in shunt.

The setting of potentiometer 29 which gives optimum correction of distortion due to amplitude changes may readily be arrived at by plotting voltage readings taken across resistor 27 against readings of instrument 22 over a small range of main amplitude variations at each of sequential settings of potentiometer 29, at the convenient value of the frequency above mentioned.

At amplitudes of the supply voltage above and below this range, but with the frequency still at the value last referred to, the compensating voltage applied across the instrument increases or decreases, as the case may be, from the value offset by adjustment of potentiometer 29, and thus applies to the pointer a force tending to displace it to one or other side of the centre reading. The sense of the connections to the instrument is such as to cause this force to oppose and balance the force due to incomplete saturation or other imperfections of components, thereby causing the instrument to continue to give the required centre reading at this frequency. The instrument then gives accurately compensated readings at other frequencies as well.

Should a zero drift be experienced due to the increase in resistance of resistor 16 on heating, this resistor may be compensated for temperature changes by being combined with a high-stability carbon component possessing a negative temperature coefficient such as to render the drift inappreciable.

Any of the foregoing embodiments may be provided with relay means (not shown) for protecting instrument 22 against excessive frequency and/or excessive voltage variations by short-circuiting or disconnecting it when such excesses occur.

It is of course possible to replace the single transformer 10 (having two secondaries 11 and 12 on a common core) of any of the above embodiments by its electrical equivalent in the form of two transformers 31 and 32 (see Fig. 4) having each a single primary winding 33 and 34 on a core 35 and 36 individual to it and a single secondary winding 37 and 38 respectively. Primaries 33 and 34 are connected in parallel with one another and their parallel combination is connected in series with inductor 14 and with the primary of current transformer 25 across the terminals 15. Alternatively the two primaries may be connected in series with one another. The remainder of the equipment is otherwise as shown in Fig. 3 and the operation is similar and so need not be described. To ensure balance of secondary outputs it is essential for cores 35 and 36 to be accurately matched, and the difficulty of ensuring this renders such an arrangement generally less convenient than the arrangements employing a single core.

What we claim is:

1. An electrical frequency meter including a transformer with a saturable core common to two like secondary windings and a single primary winding, an impedance in series with the primary winding, means for rectifying the output voltage of each secondary winding, included in series with one of the secondary windings an inductor of value such that the rectified output voltage of this winding is substantially independent of frequency and dependent only on amplitude changes effective because of incomplete saturation of said core, and means for applying the difference between the rectified output voltages of the secondary windings to an instrument adapted to respond to such a difference, whereby when the series combination of the primary winding and the impedance are energised by a voltage of amplitude large enough to cause the core approximately to saturate during each half cycle of the energising voltage the response of the instrument varies with the frequency of the energising voltage but not appreciably with the amplitude thereof, said impedance having a value small enough to allow such saturation but large enough to absorb the excess voltage after such saturation.

2. A meter as claimed in claim 1 wherein there is included in series with the other of said secondary windings an adjustable resistor whereby the reading of the instrument may be adjusted to a desired value at a predetermined value of the frequency.

3. A meter as claimed in claim 2 wherein said resistor is compensated for temperature changes.

4. A meter as claimed in claim 1 wherein compensating means are provided for applying across the instrument a rectified voltage linearly dependent on the amplitude of the primary current of the transformer, this voltage being of such sense and value as to minimise the response of the instrument to amplitude changes of said energising voltage.

5. A meter as claimed in claim 4 wherein said compensating means includes a current transformer the primary of which is in series with the primary of the first-mentioned transformer and the secondary of which is connected by way of an adjustable potentiometer to a rectifier for deriving said rectified voltage.

References Cited in the file of this patent

UNITED STATES PATENTS

| | | |
|---|---|---|
| 1,902,496 | Fitzgerald | Mar. 21, 1933 |
| 2,058,302 | Gaus | Oct. 20, 1936 |
| 2,248,586 | Rowell | July 8, 1941 |
| 2,666,180 | Petroff | Jan. 16, 1954 |